April 10, 1951 — H. GITTINS — 2,548,213
AUTOMATIC PARALLAX ADJUSTMENT FOR DUAL CAMERAS
Filed Dec. 30, 1947 — 2 Sheets-Sheet 1

Harold Gittins
INVENTOR.

April 10, 1951 H. GITTINS 2,548,213
AUTOMATIC PARALLAX ADJUSTMENT FOR DUAL CAMERAS
Filed Dec. 30, 1947 2 Sheets-Sheet 2

Harold Gittins
INVENTOR.

BY
Attorneys

Patented Apr. 10, 1951

2,548,213

UNITED STATES PATENT OFFICE 2,548,213

AUTOMATIC PARALLAX ADJUSTMENT FOR DUAL CAMERAS

Harold Gittins, Wilkes-Barre, Pa.

Application December 30, 1947, Serial No. 794,609

2 Claims. (Cl. 95—18)

This invention relates to new and useful improvements in synchronizing the focal adjustment of dual cameras whereby the object is at all focal points automatically parallaxially corrected.

A further object of the invention is to provide synchronizing connecting means between a pair of cameras whereby the focal adjustment of either of the cameras will correspondingly adjust the other camera and the parallax adjustment of the cameras with respect to a common object is automatically maintained.

A still further object is to provide an apparatus for accomplishing the aforesaid purposes which is simple and practical in construction, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
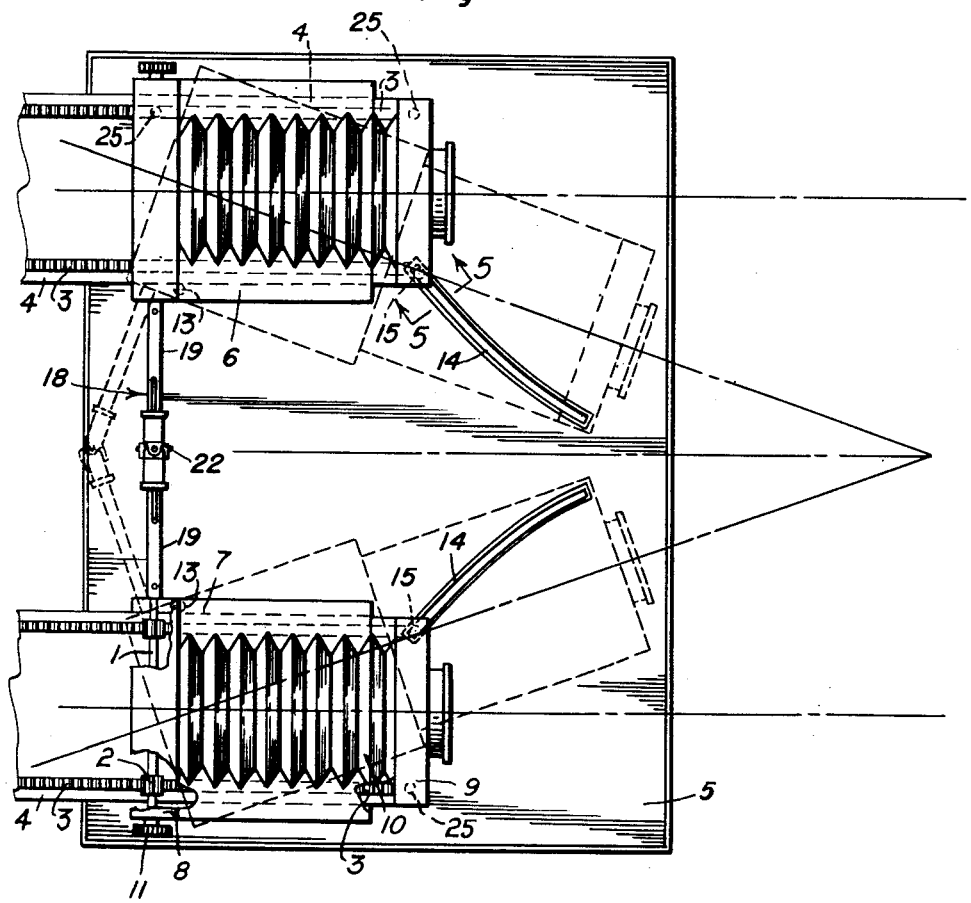
Figure 1 is a top plan view.
Figure 5:
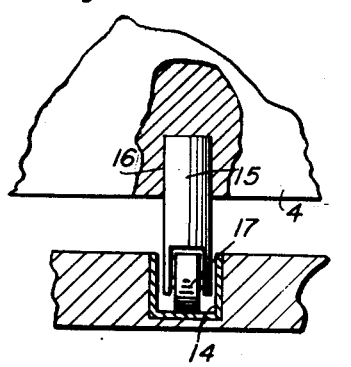
Figure 5 is an enlarged fragmentary sectional view taken substantially on a line 5—5 of Figure 1.
Figure 2:
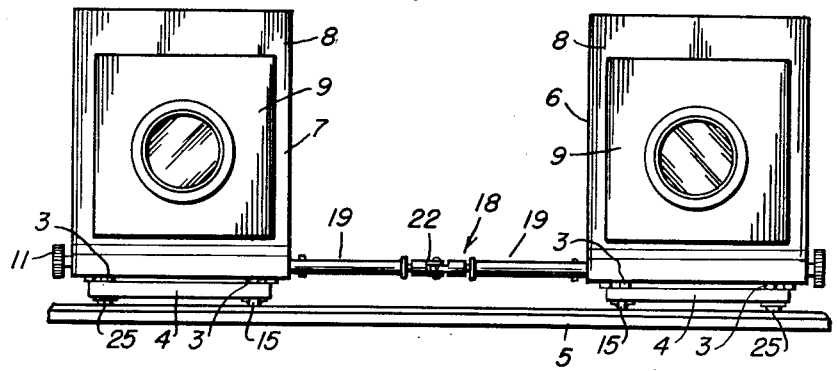
Figure 2 is a front elevational view.
Figure 3:
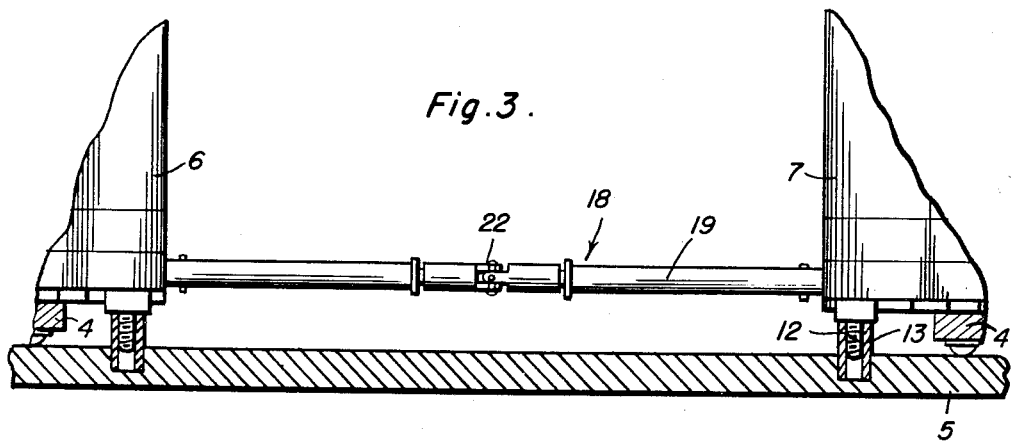
Figure 3 is a fragmentary rear elevational view with the camera supporting table shown in section.
Figure 4:
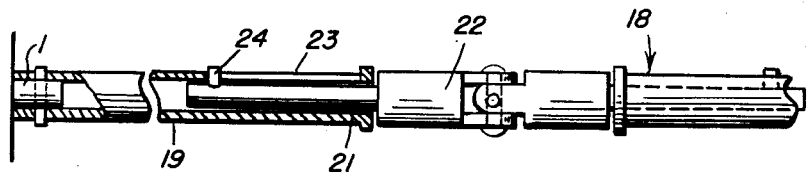
Figure 4 is an enlarged fragmentary elevational view of the extensible adjusting bar connecting the rear ends of the cameras and with parts broken away and shown in section.
Figure 6:
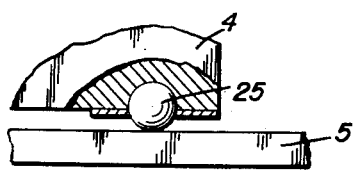
Figure 6 is an enlarged fragmentary sectional view of one of the ball supports for the cameras.

Referring now to the drawings in detail, wherein for the purpose of illustration I have disclosed a preferred embodiment of the invention the numeral 5 designates a camera table on which a pair of cameras 6 and 7 of conventional construction are mounted.

Each camera includes a rear relatively stationary ground glass frame 8 and a longitudinally adjustable front lens frame or lens board 9 and between which is positioned the usual bellows 10. The front lens frame 9 is anchored to a chassis 4 of conventional construction which is adjusted forwardly and rearwardly by the usual adjusting knob 11 projecting outwardly from one side of the rear frame 8 and secured to one end of a shaft 1 to which pinions 2 are attached for engaging racks 3 on the chassis 4.

The rear inner corner of the rear frame 8 is provided with a threadedly adjustable leg 12 rotatably supported in a tubular post 13 recessed in the table 5 to provide for a horizontal swinging movement of the camera with the leg 12 as its pivots.

A forwardly and inwardly curved track 14 is recessed in the table 5 for each of the cameras, the rear end of the track terminating adjacent the front end of the camera and the inner front edge of the chassis 4 is supported on a leg 15 which is rotatably received at its upper end in a socket 16 in the underside of the chassis and provided with a roller 17 at its lower end for travelling in the track 14.

The ends of the shafts 1 at the inner sides of the pair of cameras are connected to each other by an extensible bar designated generally at 18 and which includes a pair of tubular end members or sleeves 19 fixed at their outer ends to the respective shafts by pins 20 and a pair of inner members or rods 21 are slidably received in the outer members 19, the members 21 being pivotally connected to each other at their inner ends by a conventional universal hinge joint 22. The outer members 19 are provided with a longitudinal slot 23 and the inner members 21 are formed with laterally extending pins 24 working in the slots to limit the telescopic movement thereof and to prevent relative rotation thereof.

In the operation of the device the connecting bar 18 at the rear ends of the cameras connect the pair of cameras for uniform pivotal movement on the legs 12.

By adjusting the focus of one camera by moving its chassis forwardly while rear frame 8 remains stationary, the front ends of both cameras will move inwardly by reason of the travel of swivel legs 15 at the front ends of the chassis in the tracks 14, as indicated by the dotted lines in Figure 1 of the drawings, and the other of said cameras is automatically adjusted in a corresponding manner to thus synchronize the cameras with respect to a common focal point.

Ball bearings 25 are recessed at the underside of the chassis 4 at the outer edge thereof to ride without friction on the surface of the table to prevent tilting of the cameras.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. Synchronous focusing and centering means for dual cameras comprising the combination of a pair of cameras each including a forwardly and rearwardly adjustable chassis for a front extensible lensboard and also including a fixed gear ground glass frame, chassis adjusting means carried by each rear frame and including a transverse shaft, a table supporting the cameras in spaced apart side by side relation to each other, legs pivotally supporting the inner corners of the rear frames on and fixed to the table for horizontal swinging movement of the cameras, means connecting the shafts to each other for uniform movement of both chassis, and cooperating supporting and guiding means between the front end of each chassis and the table for synchronous movement of the front ends of the cameras toward a common center in the focal plane upon an adjusting movement of either chassis.

2. Synchronous focusing and centering means for dual cameras comprising the combination of a pair of cameras each including a forwardly and rearwardly adjustable chassis for a front extensible lensboard and also including a fixed rear ground glass frame, chassis adjusting means carried by each rear frame and including a transverse shaft, a table supporting the cameras in spaced apart side by side relation to each other, legs pivotally supporting the inner corners of the rear frames on and fixed to the table for horizontal swinging movement of the cameras, an extensible bar having a universal connection at its center and fixed at its ends to the inner ends of the respective shafts for uniform adjustment of both chassis, and cooperating supporting and guiding means between the front end of each chassis and the table for synchronous movement of the front ends of the cameras toward a common center in the focal plane upon an adjusting movement of either chassis.

HAROLD GITTINS.

REFERENCES CITED

The following references are of record in the file of this patent:

UNITED STATES PATENTS

| Number | Name | Date |
|---|---|---|
| 1,528,464 | Beidler | Mar. 3, 1925 |
| 1,755,220 | Koehne | Apr. 22, 1930 |
| 1,833,668 | Beidler | Nov. 24, 1931 |
| 2,003,754 | Miller | June 4, 1935 |